United States Patent
Sakaguchi

(10) Patent No.: US 9,045,336 B2
(45) Date of Patent: Jun. 2, 2015

(54) NON-CO2 EMITTING MANUFACTURING METHOD FOR SYNTHESIS GAS

(75) Inventor: Junichi Sakaguchi, Kanagawa (JP)

(73) Assignee: Chiyoda Corporation, Yokohama-Shi (JP)

( * ) Notice: Subject to any disclaimer, the term of this patent is extended or adjusted under 35 U.S.C. 154(b) by 0 days.

(21) Appl. No.: 14/110,263

(22) PCT Filed: Mar. 21, 2012

(86) PCT No.: PCT/JP2012/057127
§ 371 (c)(1),
(2), (4) Date: Dec. 16, 2013

(87) PCT Pub. No.: WO2012/140994
PCT Pub. Date: Oct. 18, 2012

(65) Prior Publication Data
US 2014/0120033 A1  May 1, 2014

(30) Foreign Application Priority Data
Apr. 12, 2011 (JP) .................................. 2011-087937

(51) Int. Cl.
*C01D 7/14* (2006.01)
*C01B 3/48* (2006.01)
(Continued)

(52) U.S. Cl.
CPC ... *C01B 3/48* (2013.01); *C01B 3/26* (2013.01); *C01B 3/384* (2013.01); *C01B 3/50* (2013.01); *C01B 2203/0233* (2013.01); *C01B 2203/0238* (2013.01); *C01B 2203/0283* (2013.01); *C01B 2203/0475* (2013.01); *C01B 2203/0805* (2013.01); *C01B 2203/0833* (2013.01);
(Continued)

(58) Field of Classification Search
CPC ........................................................ C01B 3/00
See application file for complete search history.

(56) References Cited

U.S. PATENT DOCUMENTS

| 6,497,856 B1 | 12/2002 | Lomax, Jr. et al. |
| 8,021,464 B2 | 9/2011 | Gauthier et al. |

(Continued)

FOREIGN PATENT DOCUMENTS

| DE | 3933284 A1 | 4/1991 |
| EP | 0737647 A2 | 10/1996 |

(Continued)

OTHER PUBLICATIONS

JP 2006056766A translation, Yagi et al., Mar. 2006.*
(Continued)

*Primary Examiner* — Melvin C Mayes
*Assistant Examiner* — Kenneth Vaden
(74) *Attorney, Agent, or Firm* — Locke Lord LLP; James E. Armstrong, IV; Nicholas J. DiCeglie, Jr.

(57) ABSTRACT

There is provided a method for producing synthesis gas without $CO_2$ emissions. In the method for producing synthesis gas by reforming a hydrocarbon gas, a reforming reaction is caused by supplying a light hydrocarbon gas containing steam and/or carbon dioxide added thereto to a catalyst-filled tube side of a shell-and-tube heat exchanger-type reformer and circulating a heating medium, such as a molten salt, heated by a heat source such as solar heat or nuclear heat in a shell side of the shell-and-tube heat exchanger-type reformer. Carbon dioxide is removed from a produced gas discharged from the tube side and is supplied to the upstream side of the tube side and recycled.

15 Claims, 2 Drawing Sheets

(51) Int. Cl.
  *C01B 3/38* (2006.01)
  *C01B 3/50* (2006.01)
  *B01J 21/10* (2006.01)
  *B01J 23/46* (2006.01)
  *C01B 3/26* (2006.01)
  *B01J 35/10* (2006.01)

(52) U.S. Cl.
  CPC ... *C01B2203/0855* (2013.01); *C01B 2203/148* (2013.01); *B01J 21/10* (2013.01); *B01J 23/462* (2013.01); *B01J 23/464* (2013.01); *B01J 35/1009* (2013.01); *C01B 2203/043* (2013.01); *C01B 2203/1064* (2013.01); *C01B 2203/1082* (2013.01); *C01B 2203/0288* (2013.01)

(56) References Cited

U.S. PATENT DOCUMENTS

| | | |
|---|---|---|
| 2006/0013762 A1 | 1/2006 | Kuipers et al. |
| 2006/0013765 A1 | 1/2006 | Litwin et al. |
| 2008/0069766 A1 | 3/2008 | Rojey et al. |
| 2008/0272340 A1 | 11/2008 | Koh |

FOREIGN PATENT DOCUMENTS

| | | | |
|---|---|---|---|
| FR | 2881417 | A1 | 8/2006 |
| JP | S58122987 | A | 7/1983 |
| JP | H06305701 | A | 11/1994 |
| JP | 2004-292240 | A | 10/2004 |
| JP | 2004292240 | A * | 10/2004 |
| JP | 2006-056766 | A | 3/2006 |
| JP | 2006056766 | A * | 3/2006 |
| JP | 2006-282413 | A | 10/2006 |
| JP | 2006282413 | A * | 10/2006 |
| WO | WO-0009441 | A2 | 2/2000 |

OTHER PUBLICATIONS

JP2004292240A translation, Kobuchi, Oct. 2004.*
JP2006282413A translation, Shina, Oct. 2006.*
International Search Report dated May 1, 2012, issued for PCT/JP2012/057127.
Extended European Search Report issued in corresponding European Patent Application No. EP 12770830.3, dated Nov. 5, 2014.

* cited by examiner

NON-CO2 EMITTING MANUFACTURING METHOD FOR SYNTHESIS GAS

TECHNICAL FIELD

The present invention relates to a method for producing synthesis gas by reforming a light hydrocarbon gas, such as natural gas, without $CO_2$ emissions into the atmosphere.

BACKGROUND ART

Synthesis gas mainly containing hydrogen ($H_2$) and carbon monoxide (CO) is widely used as a raw material for liquid fuel oils such as Gas-to-Liquids (GTL) and dimethyl ether (DME) and chemical products such as ammonia, methanol, and acetic acid. As a raw material for synthesis gas, a light hydrocarbon gas such as natural gas can be used. Synthesis gas having a $H_2/CO$ molar ratio of about 0.5 to 3 can be efficiently produced by adding steam or carbon dioxide to such a raw material gas in the presence of a catalyst and supplying heat required for reaction.

For example, when the raw material gas is methane, by adding steam, synthesis gas having a $H_2/CO$ molar ratio of 3 can be produced by steam reforming reaction represented by the following formula 1. On the other hand, when carbon dioxide ($CO_2$) is added, synthesis gas having a $H_2/CO$ molar ratio of 1 can be produced by $CO_2$ reforming reaction represented by the following formula 2.

$$CH_4+H_2O=CO+3H_2 \quad \text{[Formula 1]}$$

$$CH_4+CO_2=2CO+2H_2 \quad \text{[Formula 2]}$$

Both reforming reactions represented by the formulas 1 and 2 are endothermic. Therefore, in addition to an auto thermal reforming (ATR) reactor and a partial oxidation (POX) reformer, a tubular-type reformer, in which catalyst tubes provided in a heating furnace are heated by radiant heat from combustion gas, is conventionally used as a reactor (reformer) (Patent Literature 1). Particularly, many synthesis gas plants use tubular-type reformers because synthesis gas can be efficiently produced oven when the amount of synthesis gas produced is relatively small.

CITATION LIST

Patent Literature

Patent Literature 1: Japanese Patent Application Laid-Open No. 2006-056766

SUMMARY OF INVENTION

Technical Problem

In recent years, all fields have been required to incorporate environmentally-friendly design, and synthesis gas plants have also been required to adopt techniques to prevent emissions of greenhouse gases, typically, carbon dioxide. However, as described above, such a conventional tubular-type reformer is designed to supply heat required for reaction by using radiant heat from combustion gas, which makes it impossible to avoid the emission of carbon dioxide-containing flue gas generated to produce synthesis gas into the atmosphere.

Further, in the process of producing synthesis gas, water gas reaction (shift reaction) represented by the following formula 3 occurs in addition to the reforming reactions represented by the above formulas 1 and 2. Therefore, $CO_2$ generated by this reaction is emitted into the atmosphere in a $CO_2$ removal step for removing $CO_2$ from synthesis gas or in downstream steps for producing chemical products etc.

$$CO+H_2O=CO_2+H_2 \quad \text{[Formula 3]}$$

In view of the above circumstances, it is an object of the present invention to provide a method for producing synthesis gas without $CO_2$ emissions. It is also an object of the present invention to provide a method for producing synthesis gas having a $H_2/CO$ molar ratio of about 0.5 to 2, which is a preferred composition of a raw material for liquid fuel oils such as GTL and DME and chemical products such as methanol and acetic acid, without $CO_2$ emissions.

Solution to Problem

In order to achieve the above object, according to the present invention, there is provided a method for producing synthesis gas including: a reforming step in which a light hydrocarbon gas is reformed by supplying the light hydrocarbon gas containing steam and/or carbon dioxide added thereto to a tube side, filled with a catalyst, of a shell-and-tube heat exchanger-type reformer and circulating a heating medium heated using, as a heat source, energy not derived from fossil fuels in a shell side of the shell-and-tube heat exchanger-type reformer; and a $CO_2$ removal step in which a produced gas discharged from the tube side is subjected to $CO_2$ removal to obtain synthesis gas and a removed carbon dioxide is supplied to an upstream side of the tube side and recycled.

Advantageous Effects of Invention

According to the present invention, it is possible to produce synthesis gas from a light hydrocarbon gas without $CO_2$ emissions, which has been considered as a main cause of global warming, into the atmosphere. Further, it is also possible to produce synthesis gas having a $H_2/CO$ molar ratio of about 0.5 to 2, which is preferably used as a raw material for liquid fuel oils such as GTL and DME and chemical products such as methanol and acetic acid, from a light hydrocarbon gas without $CO_2$ emissions.

DESCRIPTION OF EMBODIMENTS

Hereinbelow, one specific example of a method for producing synthesis gas according to the present invention will be described with reference to a block flow diagram shown in FIG. 1. The method for producing synthesis gas shown in FIG. 1 includes a reforming step and a $CO_2$ removal step. In the reforming step, a light hydrocarbon gas is reformed by supplying the light hydrocarbon gas containing steam and/or carbon dioxide added thereto to a tube side, filled with a catalyst, of a shell-and-tube heat exchanger-type reformer 3 and circulating a heating medium heated using, as a heat source, alternative energy such as solar heat in a shell side of the shell-and-tube heat exchanger-type reformer 3.

In the $CO_2$ removal step, a produced gas discharged from the tube side of the shell-and-tube heat exchanger-type reformer 3 is subjected to $CO_2$ removal in a $CO_2$ removal unit 7 to obtain synthesis gas, and a removed carbon dioxide is supplied to the upstream side of the tube side of the shell-and-tube heat exchanger-type reformer 3 and recycled.

Figure 1:
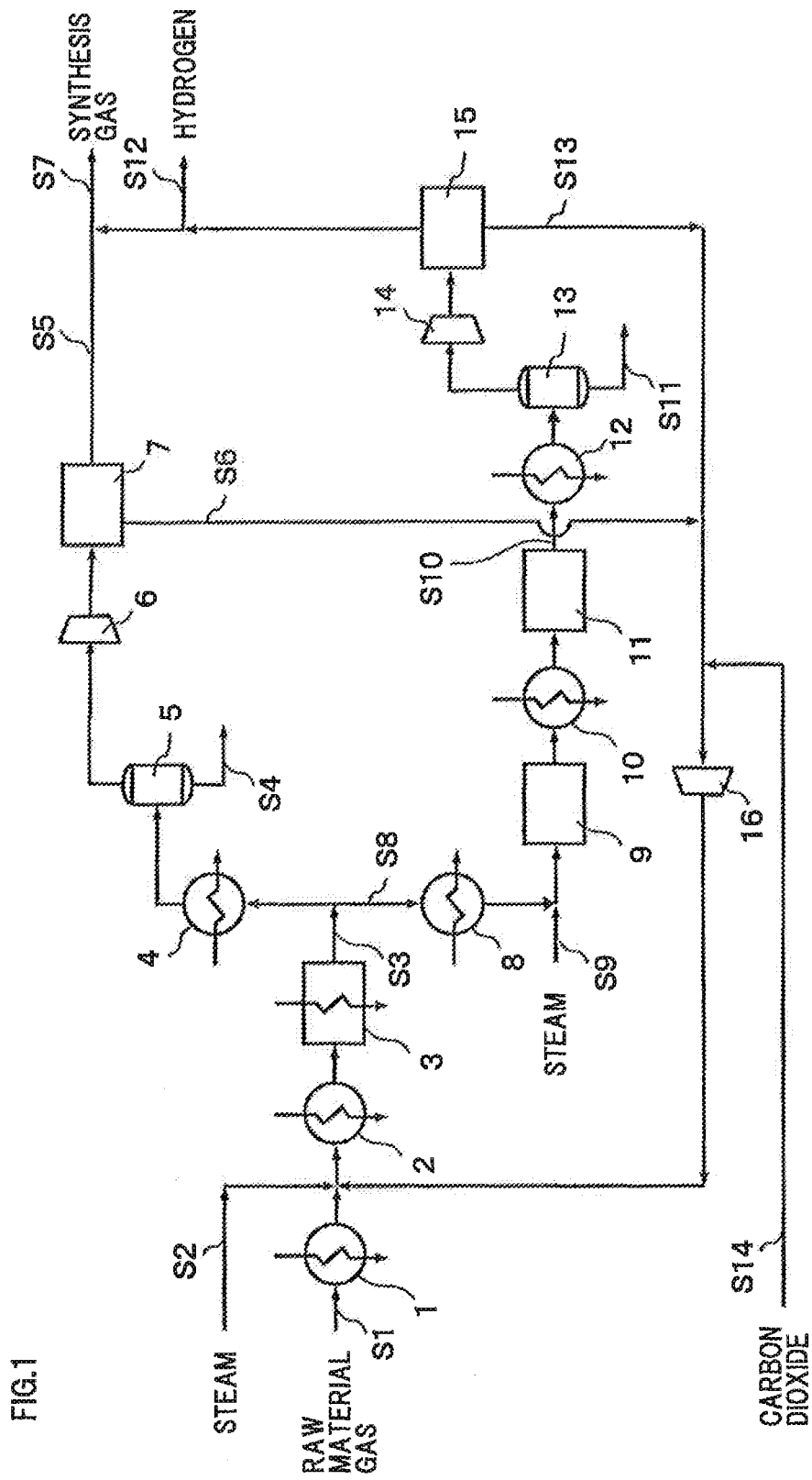
FIG. 1 is a block flow diagram of one specific example of a method for producing synthesis gas according to the present invention.

The method for producing synthesis gas shown in FIG. 1 further includes a shift step and a hydrogen separation step. In the shift step, part of the produced gas discharged from the tube side of the shell-and-tube heat exchanger-type reformer 3 is continuously extracted and subjected to a shift reaction in shift reaction units 9 and 11. In the hydrogen separation step, hydrogen gas is separated by a hydrogen separation unit 15 such as PSA from a gas obtained by the shift step. A carbon dioxide-containing gas that remains after separation of the hydrogen gas is supplied to the upstream side of the tube side of the shell-and-tube heat exchanger-type reformer 3 and is recycled together with the carbon dioxide removed in the $CO_2$ removal step.

Each of these steps will be described more specifically. First, the light hydrocarbon gas as a raw material gas is fed to a first heating means 1 such as a heat exchanger and heated therein to a predetermined temperature by a heating medium such as low-pressure steam. The heated light hydrocarbon gas joins a recycle gas from the $CO_2$ removal step (which will be described later). When the hydrogen separation step is further provided, a recycle gas from the hydrogen separation step also joins the heated light hydrocarbon gas. It is to be noted that carbon dioxide may be externally introduced into the recycle gas(es). In this case, $CO_2$ fixation and utilization of $CO_2$ as a resource can also be achieved, which further contributes to the prevention of global warming.

When these raw material gas and recycle gas(es) join together, the flow rates of the raw material gas and the recycle gas(es) are preferably controlled so that the molar ratio of carbon dioxide to carbon of a gas obtained by joining the raw material gas and the recycle gas(es) together (i.e., a value determined by dividing the number of moles of $CO_2$ by the total number of moles of carbon atoms contained in the hydrocarbon) becomes 0.6 to 13.0. If this value is less than 0.6, the amount of methane remaining in the synthesis gas increases. On the other hand, if this value exceeds 13.0, the duty of a third compressor 16, which is a recycle gas compressor, significantly increases.

If necessary, saturated steam having a pressure of about 0.8 to 3.3 MPaG is added to the gas obtained by joining the raw material gas and the recycle gas(es) together. When such saturated steam is added, the molar ratio of steam to carbon of a mixed gas containing the raw material gas (light hydrocarbon gas), the recycle gas(es) (which may contain carbon dioxide externally supplied, if necessary), and the saturated steam (i.e., a value determined by dividing the number of moles of $H_2O$ by the total number of moles of carbon atoms contained in the light hydrocarbon gas, which is also referred to as an "S/C molar ratio") is preferably 0.8 to 5.5. If this value is less than 0.8, carbon is likely to be deposited on the catalyst. On the other hand, if this value exceeds 5.5, the duty of the reformer significantly increases.

The mixed gas is then fed to a second heating means 2 such as a heat exchanger and heated therein to about 500° C. by a heating medium such as high-pressure steam, and is then fed to the reforming step. In the reforming step, the light hydrocarbon gas is reformed by supplying the mixed gas to the catalyst-filled tube side of the shell-and-tube heat exchanger-type reformer 3 and circulating a heating medium heated using, as a heat source, energy not derived from fossil fuels in the shell side of the shell-and-tube heat exchanger-type reformer 3.

The shell-and-tube heat exchanger-type reformer 3 is controlled so that the outlet temperature of the tube side is 550 to 900° C. and the outlet pressure of the tube side is 0.15 to 3.0 MPaG. This makes it possible to allow a reforming reaction to proceed successfully. If the outlet temperature is less than 550° C., the reaction does not reach equilibrium. On the other hand, if the outlet temperature exceeds 900° C., it will exceed the design temperature of existing tubes. Further, if the outlet pressure is less than 0.15 MPaG, the produced gas cannot pass through downstream apparatuses. On the other hand, if the outlet pressure exceeds 3.0 MPaG, the conversion rate of the light hydrocarbon decreases.

Figure 2:
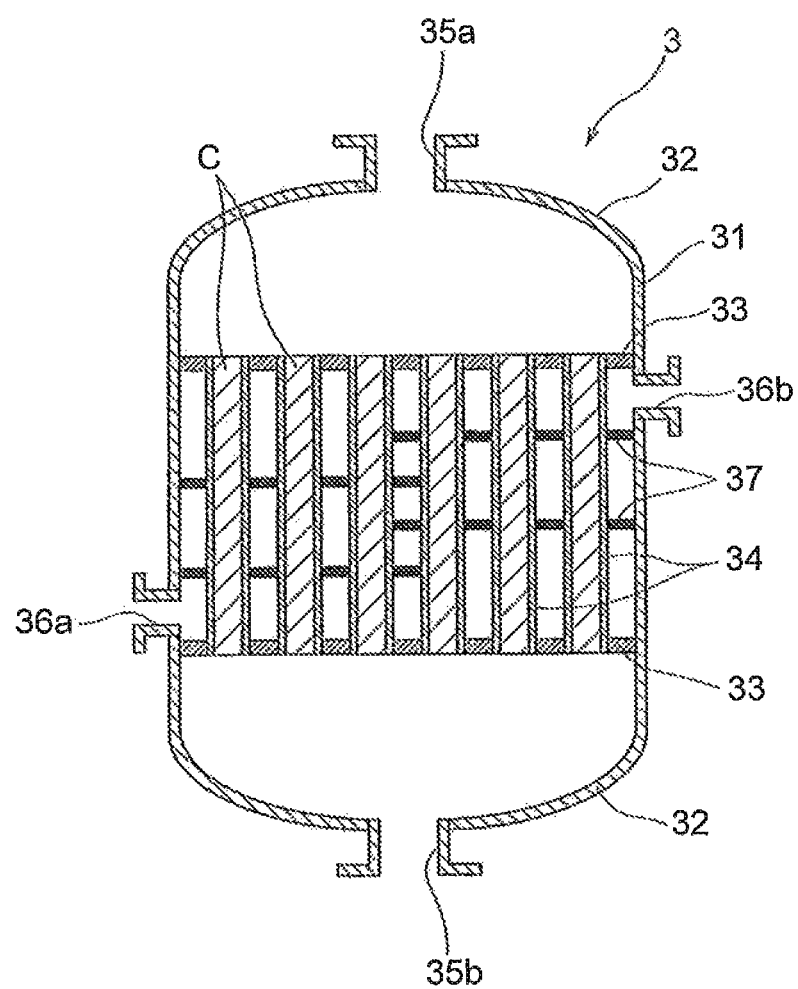
FIG. 2 is a schematic diagram of a shell-and-tube heat exchanger-type reformer appropriately used in the method for producing synthesis gas according to the present invention.

As the shell-and-tube heat exchanger-type reformer 3, a conventional shell-and-tube heat exchanger can be used. For example, the shell-and-tube heat exchanger-type reformer 3 shown in FIG. 2 can be used. More specifically, hemispheric or semielliptical dish members 32 are provided at the both ends of a cylinder part 31, and two tube plates 33 are attached to the cylinder part 31 so as to be separated from each other in a vertical direction and to seal the inner wall of the cylinder part 31. Further, a plurality of tubes 34 are provided at regular intervals between these two tube plates 33. The both ends of each of the tubes 34 pass through the upper and the lower tube plates 33 and open into the dish members 32.

The upper and the lower dish members 32 have an inlet nozzle 35a and an outlet nozzle 35b, respectively, through which a fluid flowing through the inside of the tubes 34 (also referred to as a "tube side") enters and exits the shell-and-tube heat exchanger-type reformer 3. The cylinder 31 has an inlet nozzle 36a and an outlet nozzle 36b through which a fluid flowing through the outside of the tubes 34 (also referred to as a "shell side") enters and exits the shell-and-tube heat exchanger-type reformer 3. The inlet nozzle 36a and the outlet nozzle 36b are provided between the two tube plates 33 in the cylinder 31. Such a structure makes it possible to perform heat exchange between the tube-side fluid and the shell-side fluid without mixing them.

It is to be noted that one or two or more baffle plates 37 (in FIG. 2, four baffle plates 37 are shown by way of example) may be provided between the two tube plates 33 to prevent the shell-side fluid from being discharged through the outlet nozzle 36b without undergoing sufficient heat exchange. Further, a metal mesh or a metal grid is preferably attached to the lower surface of the lower tube plate 33 to support the catalyst.

The inside of the tubes 34 of the shell-and-tube heat exchanger-type reformer 3 is filled with a reforming catalyst C. As the reforming catalyst, it is preferable to use a magnesium oxide as a carrier and ruthenium and/or rhodium loaded thereon in an amount of 200 to 2000 wtppm in terms of metal. This is because, according to the method for producing synthesis gas of the present invention, the recycle gas(es) containing carbon dioxide is(are) supplied to the upstream side of the tube side of the shell-and-tube heat exchanger-type reformer 3 and recycled, and therefore the tube side of the shell-and-tube heat exchanger-type reformer 3 is under conditions where carbon is likely to be deposited by a side reaction. If a conventional Ni-based steam reforming catalyst is used, carbon deposition occurs, which easily deactivates the catalyst.

On the other hand, the use of such a reforming catalyst having a magnesium oxide as a carrier and ruthenium and/or rhodium loaded thereon in a predetermined amount makes it possible to maintain high catalytic activity against the light hydrocarbon gas to produce synthesis gas while significantly reducing carbon deposition activity. It is to be noted that if the amount of ruthenium and/or rhodium loaded on the carrier is less than 200 wtppm, it is difficult to obtain sufficient catalytic activity. On the other hand, if the amount of ruthenium and/or rhodium loaded on carrier exceeds 2000 wtppm, carbon is likely to be deposited on the surface of the catalyst.

The magnesium oxide used as a carrier preferably has a specific surface area of 0.1 to 5.0 $m^2/g$ as measured based on the BET method. Further, the magnesium oxide used as a carrier preferably has a ring shape, a multi-hole shape, or a tablet shape. When the inside of the tubes 34 have an inner diameter of about 15 to 150 mm and the carrier of the catalyst filling the tubes has such a shape, a catalytic reaction can successfully proceed. If the specific surface area is less than 0.1 $m^2/g$, sufficient catalytic activity cannot be obtained. On the other hand, if the specific surface area exceeds 5.0 $m^2/g$, carbon is likely to be deposited on the surface of the catalyst.

When the above-described specific example of the catalyst used in the present invention is prepared, the magnesium oxide used as its carrier can be formed by, for example, tableting a mixture obtained by sufficiently mixing magnesium oxide powder and a molding aid such as graphite. The purity of the magnesium oxide is preferably 98 mass % or more, more preferably 99 mass % or more. Particularly, it is not preferred that the magnesium oxide contains impurities such as a component that enhances carbon deposition activity and a component that is decomposed under a high-temperature reducing gas atmosphere (e.g., metals such as iron and nickel and silicon dioxide ($SiO_2$)). The amount of these impurities contained in the magnesium oxide is preferably 1 mass % or less, more preferably 0.1 mass % or less.

In order to load a catalytic metal on the magnesium oxide used as a carrier, a common method such as an impregnation method can be used. For example, in the case of an impregnation method, a carrier is dispersed in an aqueous metal salt solution of ruthenium and/or rhodium. Thereafter, the carrier is separated from the aqueous solution, dried, and calcined.

Alternatively, a method in which air is evacuated from the carrier, a solution of a metal salt is added little by little in an amount approximately equal to the volume of pores to evenly wet the surface of the carrier, and the carrier is dried and calcined (i.e., an incipient wetness method) or a method in which a solution of a metal salt is sprayed onto the carrier (i.e., a spray method) may be used. In these methods, a water-soluble salt such as an inorganic acid salt (e.g., a nitrate or a chloride) or an organic acid salt (e.g., an acetate or an oxalate) can be used as the catalytic metal salt. Alternatively, the carrier may be impregnated with a solution obtained by dissolving, for example, a metal acetylacetonato salt in an organic solvent such as acetone.

When the carrier is impregnated with a solution of such a water-soluble salt, the temperature of drying is preferably 100 to 200° C., more preferably 100 to 150° C. On the other hand, when the carrier is impregnated with an organic solvent solution, the carrier is preferably dried at a temperature higher than the boiling point of the solvent used by 50 to 100° C. The temperature and time of calcination after drying are appropriately selected depending on the specific surface area of the carrier obtained, and it is preferred that the carrier is generally calcined at a temperature in the range of 500 to 1100° C. for about 3 to 5 hours.

The inside of the tubes 34 of the shell-and-tube heat exchanger-type reformer 3 is filled with the catalyst so that a gas hourly space velocity (GHSV) of, for example, 250 to 6000 $hr^{-1}$ is achieved. The inner diameter, length, and number of the tubes 34 filled with the catalyst are determined also in consideration of that, as described above, the outlet temperature and outlet pressure of the tube side are 550 to 900° C. and 0.15 to 3.0 MPaG, respectively.

As the heating medium circulated in the shell side, a molten carbonate having a temperature of about 200 to 600° C. can be used. This is because a molten carbonate having a temperature within such a range can be prepared by using, as a heat source, various alternative energies such as renewable energy without using combustion energy from fossil fuel.

For example, a concentrated solar power (CSP) system which generates power using the thermal energy of sunlight concentrated by lenses or mirrors can use a molten carbonate as a heating medium having a temperature within the above range. Therefore, when provided adjacent to a CSP system, the shell-and-tube heat exchanger-type reformer 3 can share a molten carbonate as the heating medium with the CSP system. By using a molten carbonate as the heating medium in this way, it is possible to obtain heat required for the reforming reaction without carbon dioxide emissions.

Instead of such a molten carbonate, air, nitrogen, helium, carbon dioxide, or a mixed gas of two or more of them having a temperature in the range of about 200 to 1000° C. may be used as the heating medium. A gas having a temperature within such a range can be prepared by using nuclear heat as a heat source. For example, when provided adjacent to an atomic power plant, the shell-and-tube heat exchanger-type reformer 3 can share a gas used for cooling heat generated in a nuclear reactor with the atomic power plant and can circulate the gas in the shell side thereof. Also in this case, heat required for the reforming reaction can be obtained without carbon dioxide emissions.

As the heating medium circulated in the shell side, an exhaust gas discharged from a blast furnace may also be used. In this case, the exhaust gas may contain carbon dioxide, and therefore, strictly speaking, when carbon dioxide generated by operating the blast furnace is also taken into consideration, it cannot be said that heat required for the reforming reaction can be obtained without carbon dioxide emissions. However, for example, when the shell-and-tube heat exchanger-type reformer 3 is newly provided adjacent to an existing blast furnace to effectively utilize the heat of an exhaust gas discharged from the blast furnace as waste, there can be obtained an advantage that synthesis gas can be produced without additional carbon dioxide emissions because that does not mean that a new discharge source of carbon dioxide is added.

The produced gas discharged from the tube side of the shell-and-tube heat exchanger-type reformer 3 is fed to a first cooling means 4 such as a heat exchanger and cooled therein to about 40° C. by a cooling medium such as cooling water. Condensed water generated by the cooling is removed in a first gas-liquid separation vessel 5, and then the produced gas is pressurized to a predetermined pressure by a first compressor 6, and is then fed to the $CO_2$ removal step.

In the $CO_2$ removal step, carbon dioxide contained in the produced gas is removed by the $CO_2$ removal unit 7 using a common $CO_2$ removal process such as chemical absorption or physical absorption. For example, in the case of chemical absorption using an alkanolamine solution, carbon dioxide can efficiently be removed from the produced gas by supplying the produced gas to the bottom of an absorption tower equipped with trays or a packing material in such a manner that the produced gas is brought into gas-liquid contact with an absorbent flowing downward from the top of the absorption tower. The absorbent that has absorbed carbon dioxide is extracted from the bottom of the absorption tower, fed to a regeneration tower, and regenerated with stripping steam.

Carbon dioxide stripped by the regeneration tower can be collected from the top of the regeneration tower. The collected carbon dioxide is fed to a third compressor 16 as a recycle gas together with a gas collected by the hydrogen separation unit 15 such as PSA (which will be described later), pressurized therein to a predetermined pressure, and supplied to the upstream side of the tube side of the shell-and-tube heat exchanger-type reformer 3 and recycled.

By reforming a light hydrocarbon gas by the above-described method including the reforming step and the $CO_2$ removal step, it is possible to obtain synthesis gas without carbon dioxide emissions into the atmosphere. Meanwhile, synthesis gas has an acceptable $H_2/CO$ molar ratio range depending on its intended use. For example, synthesis gas used as a raw material for Fischer-Tropsch synthesis or methanol synthesis is required to have a $H_2/CO$ molar ratio of about 2, and synthesis gas used as a raw material for DME direct synthesis is required to have a $H_2/CO$ molar ratio of about 1. In order to directly produce such synthesis gas having a $H_2/CO$ molar ratio of 2 or less by a reforming reaction, a great deal of $CO_2$ needs to be present in a raw material gas. Further, there is a case where high-purity hydrogen gas needs to be produced in addition to synthesis gas having a desired $H_2/CO$ molar ratio.

Therefore, in the specific example of the method for producing synthesis gas according to the present invention, part of the produced gas discharged from the tube side of the shell-and-tube heat exchanger-type reformer 3 is continuously extracted and fed to the shift step. In the shift step, CO is shifted to $H_2$, and then the resulting gas is subjected to the hydrogen separation step. In the hydrogen separation step, hydrogen gas is separated, and in addition, a $CO_2$-containing gas that remains after separation of the hydrogen gas is merged with the raw material gas and is recycled. This makes it possible to produce high-purity $H_2$ and synthesis gas having a desired $H_2/CO$ molar ratio.

More specifically, part of the produced gas continuously extracted through the tube-side outlet of the shell-and-tube heat exchanger-type reformer 3 is fed to a second cooling means 8 such as a heat exchanger and cooled therein to a temperature suitable for the subsequent shift reaction. The part of the produced gas thus cooled is mixed with steam if necessary, and is then fed to the shift step using the high-temperature shift reaction unit 9 and the low-temperature shift reaction unit 11.

In the high-temperature shift reaction unit 9, a high-temperature shift reaction is performed in the presence of an iron-chromium- or copper-chromium-based catalyst. A gas discharged from the high-temperature shift reaction unit 9 is cooled to a predetermined temperature by a third cooling means 10 and then fed to the low-temperature shift reaction unit 11. In the low-temperature shift reaction unit 11, a low-temperature shift reaction is performed in the presence of a copper-zinc-based catalyst.

A gas discharged from the low-temperature shift reaction unit 11 is fed to a fourth cooling means 12 and cooled therein to a predetermined temperature. Condensed water generated by the cooling is removed in a second gas-liquid separation vessel 13, and then the gas is pressurized to a predetermined pressure by a second compressor 14 and then fed to the hydrogen separation step. In the hydrogen separation step, the gas is separated into high-purity hydrogen gas and other gases by the hydrogen separation unit 15 such as a pressure swing adsorption (PSA) unit.

When a PSA unit is used, high-purity hydrogen gas can be obtained by adsorption and desorption using a porous material while a carbon dioxide-containing gas can be collected. As described above, the carbon dioxide-containing gas is supplied to the upstream side of the tube side of the shell-and-tube heat exchanger-type reformer 3 as a recycle gas together with the carbon dioxide discharged in the $CO_2$ removal step and is recycled.

As described above, according to the method for producing synthesis gas of the present invention, heat required for the reforming reaction is supplied by using the heating medium heated by energy alternative to fossil fuels, and therefore $CO_2$ is not emitted into the atmosphere due to the production of synthesis gas. Further, $CO_2$ generated by the reforming reaction and the shift reaction is separated, and is then supplied to the upstream side of the reforming step and is recycled, and therefore $CO_2$ is not emitted into the atmosphere from a process fluid playing a role in the reforming reaction and the shift reaction, either. Further, the method for producing synthesis gas according to the present invention can treat externally-supplied $CO_2$ and therefore also can play a role not only in reducing $CO_2$ emissions but also in utilizing $CO_2$ as a resource.

EXAMPLES

Example 1

Process design calculations were carried out on the assumption that about 40000 $Nm^3/h$ of synthesis gas and about 10000 $Nm^3/h$ of hydrogen gas are produced from natural gas, which is a light hydrocarbon gas as a raw material gas, with the use of a molten carbonate as a heating medium in accordance with the block flow diagram shown in FIG. 1. The process design calculations were performed under the conditions that the outlet temperature of the tube side of the shell-and-tube heat exchanger-type reformer 3 is 550° C., the outlet pressure of the tube side of the shell-and-tube heat exchanger-type reformer 3 is 0.15 MPaG, and saturated steam at 800 kPaG is added to the raw material gas.

The flow rates and compositions of flows determined by the process design calculations are shown in the following Table 1. It is to be noted that stream numbers listed in Table 1 correspond to those shown in FIG. 1.

TABLE 1

| Stream number | S1 | S2 | S3 | S4 | S5 | S6 | S7 |
|---|---|---|---|---|---|---|---|
| Temperature (° C.) | — | Saturated | 550 | — | 40 | — | — |
| Pressure (MPaG) | — | 0.8 | 0.15 | — | — | — | — |
| Flow rate | | | | | | | |
| ($Nm^3/h$) | 13,900 | — | 298,000 | — | 33,500 | 100,000 | 39,600 |
| (ton/h) | — | 53.8 | — | 29.4 | — | — | — |

TABLE 1-continued

| Composition (mol %) | | | | | | | |
|---|---|---|---|---|---|---|---|
| H₂ | — | — | 10 | — | 52 | — | 60 |
| CO | — | — | 6.7 | — | 35 | — | 30 |
| CO₂ | — | — | 57 | — | — | 100 | — |
| H₂O | — | 100 | 24 | 100 | 0.7 | — | 0.6 |
| N₂ | 0.1 | — | — | — | — | — | — |
| CH₄ | 93 | — | 2.3 | — | 11 | — | 10 |
| C2 | 3.7 | — | — | — | — | — | — |
| C3 | 2.1 | — | — | — | — | — | — |
| C4 | 1.2 | — | — | — | — | — | — |
| C5 | 0.4 | — | — | — | — | — | — |

| Stream number | S8 | S9 | S10 | S11 | S12 | S13 | S14 |
|---|---|---|---|---|---|---|---|
| Temperature (° C.) | — | — | 214 | — | — | 40 | — |
| Pressure (MPaG) | — | — | — | — | — | — | — |
| Flow rate | | | | | | | |
| (Nm³/h) | 123,000 | — | 123,000 | — | 10,000 | 93,200 | 0.0 |
| (ton/h) | — | 0.0 | — | 10.8 | — | — | — |
| Composition (mol %) | | | | | | | |
| H₂ | 10 | — | 16 | — | 100 | 3.9 | — |
| CO | 6.7 | — | 0.3 | — | — | 0.4 | — |
| CO₂ | 57 | — | 64 | — | — | 84 | 100 |
| H₂O | 24 | 100 | 17 | 100 | — | 8.6 | — |
| N₂ | — | — | — | — | — | — | — |
| CH₄ | 2.3 | — | 2.3 | — | — | 3.0 | — |
| C2 | — | — | — | — | — | — | — |
| C3 | — | — | — | — | — | — | — |
| C4 | — | — | — | — | — | — | — |
| C5 | — | — | — | — | — | — | — |

Further, main apparatuses were roughly designed based on the calculation results shown in the above Table 1. As a result, the heat-transfer area of the shell-and-tube heat exchanger-type reformer 3 was 4070 m² and a total net input duty was 380 MW.

From the results shown in the above Table 1 and the results of the rough design of the apparatuses, it has been found that synthesis gas can be produced using common apparatuses without CO₂ emissions into the atmosphere.

Then, a test was performed to evaluate the performance of a catalyst under reforming reaction conditions employed in the process design calculations. The catalyst used was a magnesium oxide carrier having a surface area of 0.5 m²/g and 800 wtppm of ruthenium loaded thereon. As a result, a hydrocarbon conversion rate of 64% was kept constant even during operation for 3000 hours. From this, it has been found that the use of such a catalyst allows stable operation over a long period of time without causing problems such as carbon deposition.

Example 2

Process design calculations were carried out under the same design conditions as in Example 1 except that the outlet temperature and outlet pressure of the tube side of the shell-and-tube heat exchanger-type reformer 3 were changed to 850° C. and 2.00 MPaG, respectively, the steam added to the raw material gas was changed to saturated steam at 3300 kPaG, and the heating medium was changed from the molten carbonate to a gas.

The flow rates and compositions of flows determined by the process design calculations are shown in the following Table 2. As in the case of Example 1, stream numbers listed in Table 2 correspond to those shown in FIG. 1.

TABLE 2

| Stream number | S1 | S2 | S3 | S4 | S5 | S6 | S7 |
|---|---|---|---|---|---|---|---|
| Temperature (° C.) | — | Saturated | 850 | — | 40 | — | — |
| Pressure (MPaG) | — | 3.3 | 2.0 | — | — | — | — |
| Flow rate | | | | | | | |
| (Nm³/h) | 13,800 | — | 75,000 | — | 33,000 | 4,220 | 39,100 |
| (ton/h) | — | 12.4 | — | 5.5 | — | — | — |
| Composition (mol %) | | | | | | | |
| H₂ | — | — | 39 | — | 52 | — | 60 |
| CO | — | — | 27 | — | 35 | — | 30 |
| CO₂ | — | — | 9.6 | — | — | 100 | — |

TABLE 2-continued

| | S1 | S2 | S3 | S4 | S5 | S6 | S7 |
|---|---|---|---|---|---|---|---|
| $H_2O$ | — | 100 | 16 | 100 | 0.4 | — | 0.6 |
| $N_2$ | 0.1 | — | — | — | — | — | — |
| $CH_4$ | 93 | — | 8.9 | — | 12 | — | 10 |
| C2 | 3.7 | — | — | — | — | — | — |
| C3 | 2.1 | — | — | — | — | — | — |
| C4 | 1.2 | — | — | — | — | — | — |
| C5 | 0.4 | — | — | — | — | — | — |

| Stream number | S8 | S9 | S10 | S11 | S12 | S13 | S14 |
|---|---|---|---|---|---|---|---|
| Temperature (° C.) | — | — | 241 | — | — | 40 | — |
| Pressure (MPaG) | | | | | | | |
| Flow rate | | | | | | | |
| ($Nm^3/h$) | 30,900 | — | 43,700 | — | 10,000 | 17,600 | 0.0 |
| (ton/h) | — | 10.2 | — | 7.7 | — | — | — |
| Composition (mol %) | | | | | | | |
| $H_2$ | 39 | — | 46 | — | 100 | 20 | — |
| CO | 27 | — | 0.5 | — | — | 1.2 | — |
| $CO_2$ | 9.6 | — | 25 | — | — | 62 | 100 |
| $H_2O$ | 16 | 100 | 22 | 100 | — | 0.7 | — |
| $N_2$ | — | — | — | — | — | — | — |
| $CH_4$ | 8.9 | — | 6.3 | — | — | 16 | — |
| C2 | — | — | — | — | — | — | — |
| C3 | — | — | — | — | — | — | — |
| C4 | — | — | — | — | — | — | — |
| C5 | — | — | — | — | — | — | — |

Further, main apparatuses were roughly designed based on the calculation results shown in the above Table 2. As a result, the heat-transfer area of the shell-and-tube heat exchanger-type reformer 3 was 17811 $m^2$ and a total net input duty was 66 MW.

From the results shown in the above Table 2 and the results of the rough design to determine apparatus sizes, it has been found that the size of the shell-and-tube heat exchanger-type reformer 3 is about 4.5 times larger than that of Example 1 because of the use of a gas as the heating medium but is not particularly impractical, and therefore synthesis gas can be produced using common apparatuses without $CO_2$ emissions into the atmosphere.

Then, a test was performed to evaluate the performance of a catalyst under the above-described reforming reaction conditions in parallel with the above-described process design calculations. The catalyst used was a magnesium oxide carrier having a surface area of 0.5 $m^2/g$ and 800 wtppm of ruthenium loaded thereon. As a result, a hydrocarbon conversion rate of 64% was kept constant even during operation for 3000 hours. From this, it has been found that the above-described reforming reaction conditions were stable without causing problems such as carbon deposition.

Example 3

Process design calculations were carried out under the same design conditions as in Example 1 except that carbon dioxide was externally introduced into the suction side of the third compressor 16 and the amount of hydrogen gas produced was changed to 1180 $Nm^3/h$.

The flow rates and compositions of flows determined by the process design calculations are shown in the following Table 3. As in the case of Examples 1 and 2, stream numbers listed in Table 3 correspond to those shown in FIG. 1.

TABLE 3

| Stream number | S1 | S2 | S3 | S4 | S5 | S6 | S7 |
|---|---|---|---|---|---|---|---|
| Temperature (° C.) | — | Saturated | 850 | — | 40 | — | — |
| Pressure (MPaG) | — | 0.8 | 0.15 | — | — | — | — |
| Flow rate | | | | | | | |
| ($Nm^3/h$) | 11,800 | — | 229,000 | — | 33,500 | 100,000 | 39,600 |
| (ton/h) | — | 43.9 | — | 29.4 | — | — | — |
| Composition (mol %) | | | | | | | |
| $H_2$ | — | — | 10 | — | 52 | — | 60 |
| CO | — | — | 6.7 | — | 35 | — | 30 |
| $CO_2$ | — | — | 57 | — | — | 100 | — |
| $H_2O$ | — | 100 | 24 | 100 | 0.7 | — | 0.6 |
| $N_2$ | 0.1 | — | — | — | — | — | — |
| $CH_4$ | 93 | — | 2.3 | — | 11 | — | 10 |
| C2 | 3.7 | — | — | — | — | — | — |
| C3 | 2.1 | — | — | — | — | — | — |

TABLE 3-continued

| | | | | | | | |
|---|---|---|---|---|---|---|---|
| C4 | 1.2 | — | — | — | — | — | — |
| C5 | 0.4 | — | — | — | — | — | — |

| Stream number | S8 | S9 | S10 | S11 | S12 | S13 | S14 |
|---|---|---|---|---|---|---|---|
| Temperature (° C.) | — | — | 213 | — | — | 40 | — |
| Pressure (MPaG) | | | | | | | |
| Flow rate | | | | | | | |
| (Nm³/h) | 54,500 | — | 54,500 | — | 1,180 | 41,200 | 2,370 |
| (ton/h) | — | 0.0 | — | 4.8 | — | — | — |
| Composition (mol %) | | | | | | | |
| $H_2$ | 10 | — | 16 | — | 100 | 3.9 | — |
| CO | 6.7 | — | 0.3 | — | — | 0.4 | — |
| $CO_2$ | 57 | — | 64 | — | — | 84 | 100 |
| $H_2O$ | 24 | 100 | 17 | 100 | — | 8.6 | — |
| $N_2$ | — | — | — | — | — | — | — |
| $CH_4$ | 2.3 | — | 2.3 | — | — | 3.0 | — |
| C2 | — | — | — | — | — | — | — |
| C3 | — | — | — | — | — | — | — |
| C4 | — | — | — | — | — | — | — |
| C5 | — | — | — | — | — | — | — |

Further, main apparatuses were roughly designed based on the calculation results shown in the above Table 3. As a result, the heat-transfer area of the shell-and-tube heat exchanger-type reformer 3 was 3351 m² and a total net input duty was 330 MW.

From the results shown in the above Table 3 and the results of the rough design to determine apparatus sizes, it has been found that, as in the case of Example 1, synthesis gas can be produced by using common apparatuses without $CO_2$ emissions into the atmosphere even when carbon dioxide is externally introduced.

Example 4

Process design calculations were carried out on the assumption that synthesis gas having a $H_2/CO$ molar ratio of 0.5 is produced by performing $CO_2$ reforming by adding externally-introduced $CO_2$ gas and $CO_2$ recycle gas from the $CO_2$ removal step to a raw material gas without adding steam and then by subjecting the total amount of the resulting synthesis gas to the $CO_2$ removal step. It is to be noted that the outlet temperature and outlet pressure of the tube side of the shell-and-tube heat exchanger-type reformer 3 were 850° C. and 1.3 MpaG, respectively, and a heating medium used in the shell side was a gas.

The flow rates and compositions of flows determined by the process design calculations are shown in the following Table 4. As in the case of Examples 1 to 3, stream numbers listed in Table 4 correspond to those shown in FIG. 1.

TABLE 4

| Stream number | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| Temperature (° C.) | — | — | 850 | — | 40 | — | 40 | — | — | — | — | — | — | — |
| Pressure (MPaG) | | | 1.3 | | | | | | | | | | | |
| Flow rate | | | | | | | | | | | | | | |
| (Nm³/h) | 9,650 | — | 55,800 | — | 39,600 | 10,600 | 39,600 | — | — | — | — | — | — | 15,700 |
| (ton/h) | — | — | — | 4.5 | — | — | — | — | — | — | — | — | — | — |
| Composition (mol %) | | | | | | | | | | | | | | |
| $H_2$ | — | — | 23 | — | 32 | — | 32 | — | — | — | — | — | — | — |
| CO | — | — | 46 | — | 64 | — | 64 | — | — | — | — | — | — | — |
| $CO_2$ | — | — | 19 | — | — | 100 | — | — | — | — | — | — | — | 100 |
| $H_2O$ | — | — | 11 | 100 | 0.6 | — | 0.6 | — | — | — | — | — | — | — |
| $N_2$ | 0.1 | — | — | — | — | — | — | — | — | — | — | — | — | — |
| $CH_4$ | 93 | — | 2.0 | — | 2.8 | — | 2.8 | — | — | — | — | — | — | — |
| C2 | 3.7 | — | — | — | — | — | — | — | — | — | — | — | — | — |
| C3 | 2.1 | — | — | — | — | — | — | — | — | — | — | — | — | — |
| C4 | 1.2 | — | — | — | — | — | — | — | — | — | — | — | — | — |
| C5 | 0.4 | — | — | — | — | — | — | — | — | — | — | — | — | — |

Further, main apparatuses were roughly designed based on the calculation results shown in the above Table 4. As a result, the heat-transfer area of the shell-and-tube heat exchanger-type reformer 3 was 15895 m² and a total net input duty was 63 MW.

From the results shown in the above Table 4 and the results of the rough design to determine apparatus sizes, it has been found that synthesis gas can be produced by using apparatuses similar in size to those of Example 2 without $CO_2$ emissions into the atmosphere even when $CO_2$ reforming is performed by adding only carbon dioxide without adding steam.

It is to be noted that the results of the process design calculations made in Examples 1 to 4 and the main specifications of the apparatuses determined by the rough design based on the results of the process design calculations are summarized in the following Table 5. In Table 5, the phrase "on a heat basis" means that electric power required to operate the compressor is converted to the amount of heat required to generate the electric power. Further, the term "carbon activity" refers to a value calculated by the following formula 4. When the value of the carbon activity exceeds 1, carbon is likely to be deposited on the catalyst.

$$\text{Carbon activity} = K \times (P_{co})^2 / (P_{co_2}),  \quad [\text{Formula 4}]$$

wherein K is the equilibrium constant of a reaction of $2CO = C + CO_2$ and $P_x$ is the partial pressure of a component x.

TABLE 5

| | | Example 1 | Example 2 | Example 3 | Example 4 |
|---|---|---|---|---|---|
| Mixed gas conditions | | | | | |
| S/C molar ratio | — | — | 4.0 | 0.85 | 4.0 | — |
| $CO_2$/C molar ratio | — | — | 9.6 | 0.82 | 9.4 | 2.4 |
| Synthesis gas cond. | | | | | | |
| $H_2$/CO molar ratio | — | 2.0 | 2.0 | 2.0 | 0.5 |
| Methane content | vol % | 10 | 10 | 10 | 2.8 |
| In press of PSA unit 15 | MPaG | 1.0 | 1.8 | 1.0 | — |
| In press of $CO_2$ removal unit 7 | MPaG | 1.0 | 1.9 | 1.0 | 1.2 |
| Duty of unit | | | | | | |
| $CO_2$ removal unit 7 | MW | 177 | 7.4 | 177 | 19 |
| 1st compressor 6 | MW | 13 (43) | 0 | 13 (45) | 0 |
| 2nd compressor 14 | MW | 16 (53) | 0 | 7.3 (24) | — |
| 3rd compressor 16 | MW | 11 (37) | 3.8 (13) | 7.8 (26) | 3.7 (12) |
| 1st heating means 1 | MW | 0.9 | 0.9 | 0.8 | 0.7 |
| 2nd heating means 2 | MW | 55 | 10 | 42 | 5.2 |
| 1st cooling means 4 | MW | −37 | −13 | −37 | −16 |
| 2nd cooling means 8 | MW | −13 | −6.0 | −5.6 | — |
| 3rd cooling means 10 | MW | −13 | −6.1 | −5.8 | — |
| 4th cooling means 12 | MW | −4.4 | −3.0 | −1.9 | — |
| Duty of steam added | MW | 39 + 0 | 9.1 + 7.5 | 32 + 0 | — |
| Total net input duty | MW | 380 | 66 | 330 | 63 |
| Cond. of reformer 3 | | | | | | |
| Inlet flow rate | Nm³/h | 274570 | 15575 | 210528 | 36195 |
| In temp./out temp. | ° C. | 500/550 | 500/850 | 500/550 | 500/850 |
| Outlet pressure | MPaG | 0.15 | 2.00 | 0.15 | 1.3 |
| duty | MW | 43 | 47 | 34 | 42 |
| ΔT | ° C. | 50 | 50 | 50 | 50 |
| Overall heat-trans coef. | Kcal/m²h° C. | 200 | 50 | 200 | 50 |
| Heat-trans area req'd | m² | 3611 | 16165 | 2923 | 14445 |
| Outer dia. of tube | mm | 50.8 | 50.8 | 50.8 | 50.8 |
| Length × thick of tube | m × mm | 3 × 2.8 | 12 × 3.7 | 3 × 2.8 | 12 × 3.7 |
| Number of tubes | — | 8500 | 9300 | 7000 | 8300 |
| Effective heat-trans area | m² | 4070 | 17811 | 3351 | 15895 |
| Catalyst volume | m³ | 46 | 194 | 38 | 174 |
| GHSV | 1/h | 5950 | 265 | 5540 | 209 |
| Carbon activity at out | — | 0.90 | 0.90 | 0.90 | 0.90 |

Note:
Values in parentheses are on a heat basis.

Comparative Example 1

For a comparison purpose, process design calculations were carried out on the assumption that synthesis gas and hydrogen gas are produced in substantially the same amounts as those produced in Examples 1 and 2 by conventional high-temperature $CO_2$ reforming and steam reforming reactions. As a result, the amounts of natural gas and $CO_2$ required to produce 40000 $Nm^3/h$ of synthesis gas having substantially the same composition as those produced in Examples 1 and 2 were 11000 $Nm^3/h$ and 5 t/h, respectively, and the amount of $CO_2$ emitted into the atmosphere was 12 t/h. A total net input duty for production of such an amount of synthesis gas was 49 MW.

Further, as in the case of Examples 1 and 2, the amount of natural gas required to produce 10000 $Nm^3/h$ of hydrogen gas was 4000 $Nm^3/h$, and the amount of $CO_2$ emitted into the atmosphere was 9 t/h. A total net input duty for production of such an amount of hydrogen gas was 16 MW.

As can be seen from the results, a total net input duty was 65 MW, that is, the sum of 49 MW and 16 MW, which was much smaller than 380 MW in Example 1. On the other hand, the amount of $CO_2$ emitted into the atmosphere in Comparative Example 1 was 21 t/h, that is, the sum of 12 t/h and 9 t/h, whereas the amount of $CO_2$ emitted into the atmosphere was 0 in both Example 1 and Example 2.

Comparative Example 2

A test for evaluating catalytic performance was confirmed under the same conditions as in Example 1 except that a conventionally-used Ni-based catalyst (Ni/$Al_2O_3$, Ni: 20 wt %, surface area: 80 $m^2$/g) was used. As a result, the conversion rate of methane was reduced from 64% to 48% after 5 hours from the start of operation, and therefore the operation was stopped.

Comparative Example 3

A test for evaluating catalytic performance was confirmed under the same conditions as in Example 2 except that a conventionally-used Ni-based catalyst (Ni/$Al_2O_3$, Ni: 20 wt %, surface area: 80 $m^2$/g) was used. As a result, the conversion rate of methane was reduced from 64% to 36% after 10 hours from the start of operation, and therefore the operation was stopped.

REFERENCE SIGNS LIST

1 First heating means
2 Second heating means
3 Shell-and-tube heat exchanger-type reformer
4 First cooling means
5 First gas-liquid separation vessel
6 First compressor
7 $CO_2$ removal unit
8 Second cooling means
9 High-temperature shift reaction unit
10 Third cooling means
11 Low-temperature shift reaction unit
12 Fourth cooling means
13 Second gas-liquid separation vessel
14 Second compressor
15 Hydrogen separation unit
16 Third compressor

The invention claimed is:

1. A method for producing synthesis gas comprising: a reforming step in which a light hydrocarbon gas is reformed by supplying the light hydrocarbon gas containing steam and/or carbon dioxide added thereto to a tube side, filled with a catalyst, of a shell-and-tube heat exchanger-type reformer and circulating a heating medium heated using, as a heat source, energy not derived from fossil fuels in a shell side of the shell-and-tube heat exchanger-type reformer;
a $CO_2$ removal step in which a part of a produced gas discharged from the tube side is substantially directly subjected to $CO_2$ removal to obtain synthesis gas; and
a shift and hydrogen separation step in which the remaining part of the produced gas is subject to shift reaction and subsequent hydrogen separation to obtain hydrogen gas;
wherein the removed carbon dioxide from the $CO_2$ removal step and an effluent from the shift and hydrogen separation step are supplied to an upstream side of the tube side and recycled as raw material for the synthesis gas.

2. The method for producing synthesis gas according to claim 1, wherein the energy not derived from fossil fuels is at least one of solar heat and nuclear heat.

3. The method for producing synthesis gas according to claim 1, wherein the heating medium is a molten salt.

4. The method for producing synthesis gas according to claim 1, wherein the heating medium is air, nitrogen, helium, carbon dioxide, or a mixed gas of two or more of them.

5. The method for producing synthesis gas according to claim 1, wherein separation of the hydrogen gas is performed using a PSA unit.

6. The method for producing synthesis gas according to claim 1, wherein the $CO_2$ removal is performed by chemical absorption.

7. The method for producing synthesis gas according to claim 1, wherein an output temperature and an output pressure of the tube side of the shell-and-tube heat exchanger-type reformer are 550 to 900° C. and 0.15 to 3.0 MPaG, respectively.

8. The method for producing synthesis gas according to claim 1, wherein the gas supplied to the tube side of the shell-and-tube heat exchanger-type reformer has a steam/carbon molar ratio of 0.8 to 5.5 and a carbon dioxide/carbon molar ratio of 0.6 to 13.0.

9. The method for producing synthesis gas according to claim 1, wherein the catalyst has a magnesium oxide as a carrier and ruthenium and/or rhodium loaded thereon in an amount of 200 to 2000 wtppm in terms of metal.

10. The method for producing synthesis gas according to claim 9, wherein the carrier has a specific surface area of 0.1 to 5.0 $m^2$/g.

11. The method for producing synthesis gas according to claim 9, wherein the carrier has a ring shape, a multi-hole shape, or a tablet shape.

12. The method for producing synthesis gas according to claim 2, wherein the $CO_2$ removal is performed by chemical absorption.

13. The method for producing synthesis gas according to claim 2, wherein an output temperature and an output pressure of the tube side of the shell-and-tube heat exchanger-type reformer are 550 to 900° C. and 0.15 to 3.0 MPaG, respectively.

14. The method for producing synthesis gas according to claim 2, wherein the gas supplied to the tube side of the shell-and-tube heat exchanger-type reformer has a steam/carbon molar ratio of 0.8 to 5.5 and a carbon dioxide/carbon molar ratio of 0.6 to 13.0.

15. The method for producing synthesis gas according to claim 2, wherein the catalyst has a magnesium oxide as a carrier and ruthenium and/or rhodium loaded thereon in an amount of 200 to 2000 wtppm in terms of metal.

* * * * *